US008510747B2

(12) United States Patent
Tian et al.

(10) Patent No.: US 8,510,747 B2
(45) Date of Patent: Aug. 13, 2013

(54) METHOD AND DEVICE FOR IMPLEMENTING LOAD BALANCE OF DATA CENTER RESOURCES

(75) Inventors: Wenhong Tian, Shenzhen (CN); Guoming Lu, Shenzhen (CN); Chen Jing, Shenzhen (CN); Yuanliang Zhong, Shenzhen (CN); Jinan Hu, Shenzhen (CN); Xu Dong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/451,164

(22) Filed: Apr. 19, 2012

(65) Prior Publication Data

US 2012/0204176 A1 Aug. 9, 2012

Related U.S. Application Data

(63) Continuation of application No. PCT/CN2010/078247, filed on Oct. 29, 2010.

(51) Int. Cl.
*G06F 9/46* (2006.01)
*G06F 9/455* (2006.01)
*G06F 15/173* (2006.01)

(52) U.S. Cl.
USPC ............... 718/105; 718/1; 718/104; 709/223; 709/226

(58) Field of Classification Search
None
See application file for complete search history.

(56) References Cited

U.S. PATENT DOCUMENTS

| 6,986,139 | B1 * | 1/2006 | Kubo ............................. 718/105 |
| 7,213,065 | B2 * | 5/2007 | Watt .............................. 709/223 |
| 7,669,029 | B1 | 2/2010 | Mishra et al. |
| 8,051,174 | B2 * | 11/2011 | Xiao et al. .................... 709/226 |
| 8,230,069 | B2 * | 7/2012 | Korupolu ...................... 709/226 |
| 2009/0070771 | A1 * | 3/2009 | Yuyitung et al. .............. 718/105 |
| 2009/0125625 | A1 * | 5/2009 | Shim et al. .................... 709/226 |

(Continued)

FOREIGN PATENT DOCUMENTS

| CN | 101309208 A | 11/2008 |
| CN | 101504620 A | 8/2009 |
| CN | 101639793 A | 2/2010 |

OTHER PUBLICATIONS

Office Action issued in corresponding Chinese Patent Application No. 201080005220.3, mailed Jan. 14, 2013.

(Continued)

*Primary Examiner* — Jennifer To
(74) *Attorney, Agent, or Firm* — Brinks Hofer Gilson & Lione (57) ABSTRACT

The present disclosure relates to a method and a device for implementing load balance of data center resources, and the method includes: obtaining current utilization ratios of properties of each physical machine in a scheduling domain, and determining, according to the current utilization ratios, physical machines that have residual capability satisfying a current allocation task, where the properties include a CPU load, a memory load and a network load; predicting a load degree of each of the physical machines on the assumption that the virtual machine is allocated by each of the physical machines; selecting, according to the predicted load degree of each of the physical machines, a physical machine from the physical machines to allocate the virtual machine. By adopting the solutions of the present disclosure, the problem of the load imbalance caused by the inconsistency of specification requirements of users and specifications of physical servers is solved.

16 Claims, 4 Drawing Sheets

(56) References Cited

U.S. PATENT DOCUMENTS

| | | | |
|---|---|---|---|
| 2009/0133018 A1* | 5/2009 | Kaneki | 718/1 |
| 2009/0222544 A1* | 9/2009 | Xiao et al. | 709/223 |
| 2009/0228589 A1* | 9/2009 | Korupolu | 709/226 |
| 2009/0300210 A1* | 12/2009 | Ferris | 709/235 |
| 2010/0262964 A1* | 10/2010 | Uyeda et al. | 718/1 |
| 2010/0332657 A1* | 12/2010 | Elyashev et al. | 709/226 |
| 2011/0252420 A1* | 10/2011 | Tung et al. | 718/1 |

OTHER PUBLICATIONS

Search Report issued in corresponding Chinese Patent Application No. 201080005220.3, mailed Dec. 13, 2012.

Zheng et al., "Design and Implementation of Load Balancing in Web Server Cluster System" Journal of Nanjing University of Aeronautics & Astronautics, vol. 38, No. 3 Jun. 2006.

Singh et al., "Server-Storage Virtualization: Integration and Load Balancing in Data Centers" 2008.

Written Opinion of the International Searching Authority issued in corresponding PCT Application No. PCT/CN2010/078247 (including English Translation and Verification of Translation); mailed Jul. 7, 2012.

English translation of claims in corresponding PCT Application No. PCT/CN2010/078247(including verification of translation).

International Search Report issued in corresponding PCT Patent Application No. PCT/CN2010/078247, mailed Jul. 7, 2011.

* cited by examiner

METHOD AND DEVICE FOR IMPLEMENTING LOAD BALANCE OF DATA CENTER RESOURCES

CROSS-REFERENCE TO RELATED APPLICATIONS

This application is a continuation of International Application No. PCT/CN2010/078247, filed on Oct. 29, 2010, which are hereby incorporated by reference in their entireties.

FIELD

The present disclosure relates to the field of computer data processing, and in particular, to a method and a device for implementing load balance of data center resources.

BACKGROUND

Figure 1:
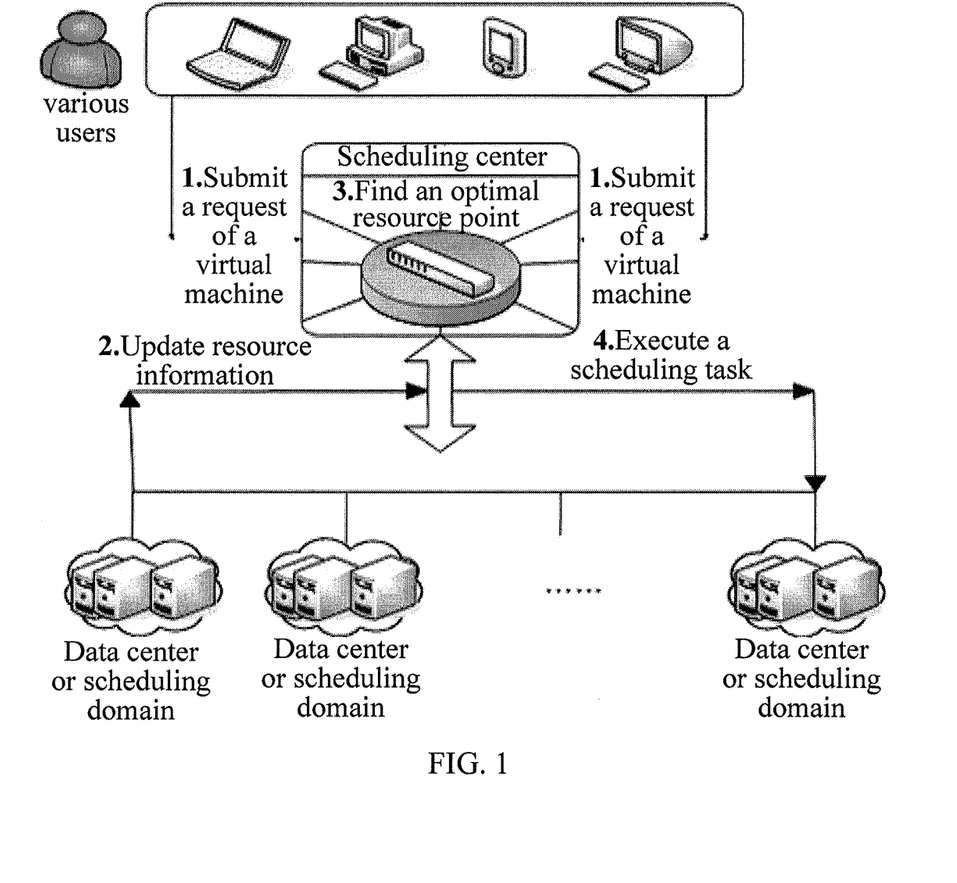
FIG. 1 is a schematic structural diagram of a reference system of an existing scheduling system.

A cloud computing data center, serving as a large-scale server cluster, includes a great number of physical servers with different specification configurations, and through a virtualization technology, each of the physical servers may virtualize multiple virtual machines to deploy and schedule resources for users. Generally, a main procedure of a scheduling system of the cloud computing data center is as shown in FIG. 1, which is as follows: A user initiates a request through the Internet; a super scheduling center submits the request to a proper data center according to identity features of the user and features of the requested service, and then a management program of the data center submits the request to a certain scheduling domain, a certain scheduling algorithm is executed in the scheduling domain to request allocation of the resources; the scheduling center executes a background optimization operation at the same time, and sorts the resources of different data centers according to optimization objective functions, idle information and configuration information for use by a subsequent user; a scheduling task is executed after requesting for allocating the resources, the resources are deployed and the user begins to use the resources. The scheduling domain includes a group of physical machines which are grouped based on some policies or rules, the policies or rules can include business reasons, technical reasons or others.

The cloud computing data center dynamically and automatically allocate the virtual machines to the users according to specification requirements of the users. However, the specification requirements of the users may be different from the specification configurations of all the physical servers in the data center, and if a simple allocation scheduling method such as a round-robin scheduling method, a weighted round-robin scheduling method, a minimum load (or least-connection scheduling) priority method, a weighted least-connection scheduling priority method, or a hash method is adopted, it is difficult to achieve load balance of the physical servers.

According to the round-robin scheduling method, a rotation period is preset to sequentially allocate the virtual machines required by the users to different physical servers, and a new rotation period begins after the previous rotation period is over. It can be seen that, according to the method, the problem of the load balance is not taken into consideration when the virtual machines are allocated.

According to the weighted round-robin scheduling method, weights are preset for the physical servers, and during the procedure of allocating the virtual machines in load balance, the physical server is rotationally selected. If the weight of the selected physical server is 0, the server is skipped and the next server is selected; if the weight of the selected physical server is not 0, the server is selected and 1 is subtracted from the weight of the server. Subsequent selection is performed in rotation on the basis of the previous selection, and therefore, the number of serving times obtained by the physical server with a high weight is in direct proportion with the weight of the physical server with the high weight.

According to the minimum load (or the least-connection scheduling) priority method, during each time of allocating the virtual machines, load conditions of all the physical servers in the current period of time are first checked, and then a physical server with a minimum load in the current period of time is selected to allocated the virtual machines. However, according to the method, the balance is implemented through properly and evenly allocating the number of accesses instead of through scheduling and allocating the virtual machines, which cannot implement load balance of physical resources in the data center.

The weighted least-connection scheduling method is similar to the weighting round-robin scheduling method, where different weights are set for the physical servers with different specification configurations, and the virtual machines are selected and allocated according to the weights set for the servers.

According to the hash method, a hash function is preset to map the virtual machines required by the users to the corresponding physical servers, and an execution speed is fast. However, it is impossible to design a hash function that meets the specification requirements of the users, satisfies the specification configurations of different physical servers, and can solve the problem of load imbalance at the same time.

During the procedure of implementing the present disclosure, the inventor finds that the prior art at least has the following problems: the foregoing simple allocation and scheduling methods cannot solve the problem of load imbalance of the physical servers, where the load imbalance of the physical servers is caused by the inconsistency of the specification requirements of the users and the specification configurations of the physical servers.

SUMMARY

An embodiment of the present disclosure provides a method for implementing load balance of data center resources, where the method includes: a method for implementing load balance of data center resources, where the method includes: obtaining current utilization ratios of properties of each physical machine in a scheduling domain, and determining, according to the current utilization ratios, physical machines that have residual capability satisfying a current allocation task, where the properties include a CPU load, a memory load and a network load; determining load mean values of properties of the scheduling domain according to the current utilization ratios, and calculating load variance values of the physical machines according to the load mean values of the properties of the scheduling domain and load predicted values of the properties of the physical machines; and selecting a physical machine with a minimum load variance value to deploy the current allocation task.

An embodiment of the present disclosure provides a server having a processor for implementing load balance of resources in a data center. The server includes: a selection control module, configured to obtain, by the processor, current utilization ratios of properties of each physical machine in a scheduling domain, and determine, according to the current utilization ratios, physical machines that have residual capability satisfying a current allocation task, where the properties include a CPU load, a memory load and a network load; a calculation processing module, configured to determine, by the processor, load mean values of properties of the scheduling domain according to the current utilization ratios, and calculate load variance values of the physical machines according to the load mean values of the properties of the scheduling domain and load predicted values of the properties of the physical machines; and a deployment executing module, configured to select, by the processor, a physical machine with a minimum load variance value to deploy the current allocation task.

It can be seen from the solutions provided by the foregoing embodiments of the present disclosure that, through monitoring the properties of each physical machine and the current utilization ratios in the scheduling domain, current load states of the physical machines can be timely determined, and meanwhile, a proper physical machine is selected by using a minimum mean variance method, thus solving the problem of load imbalance caused by different specification requirements.

DETAILED DESCRIPTION OF THE EMBODIMENTS

An objective of the present disclosure is to provide a method and a device for implementing load balance of data center resources, which can solve the problem of load imbalance of physical servers, where the load imbalance of physical servers is caused by inconsistency of specification requirements of users and configurations of the physical servers.

Embodiments of the present disclosure provide a method and a device for implementing load balance of data center resources, which can determine, according to obtained current utilization ratios of properties of each physical machine in a scheduling domain, physical machines that have residual capability satisfying a current allocation task; determine load mean values of properties of the scheduling domain according to the current utilization ratios, and calculate load variance values of the physical machines according to the load mean values and load predicted values of the properties of the physical machines; and select a physical machine with a minimum load variance value to deploy the current allocation task. The residual capability is determined according to the obtained current utilization ratios of the properties of each physical machine, so the residual capability represents an actual state of each physical machine during scheduling. In the procedure of calculating the load variance values, a load degree of each of the physical machines after a virtual machine is deployed according to task requirements of a user is predicted, so the load state of each physical machine after the virtual machine is deployed is taken into consideration correctly, so that a proper virtual machine is selected for task deployment, and solving the problem of load imbalance caused by inconsistency of specification requirements of users and configuration specifications of physical servers in the data center, where the problem cannot be solved by using an existing simple scheduling allocation method in a cloud computing data center. Each physical machine has at least a CPU connected to a storage device such as a memory.

To further understand the solutions of the embodiments of the present disclosure, the solutions are further described in detail in the following with reference to the accompanying drawings.

First, parameters involved in an implementation procedure of the embodiments of the present disclosure are defined, which is specifically as follows:

Definition (1) A utilization ratio of a CPU is defined as: an average utilization ratio of the CPU in a period of time t;

a CPU utilization ratio lc of a physical machine is defined as: a mean value of utilization ratios of all CPUs on the physical machine;

a CPU load mean value Vc in a scheduling domain is defined as: weighted average is performed on CPU utilization ratios of all physical machines in a scheduling domain according to the number (nui) of CPUs of each physical machine to obtain the CPU load mean value Vc and a load alarm value $\delta c = b + Vc$, where b is a customized constant, and $Vc = (\Sigma lci \ast nui)/\Sigma nui$;

Definition (2) A memory utilization ratio lm of a physical machine is defined as: an average utilization ratio of the physical machine in a period of time t;

a memory load mean value Vm is defined as: a mean value Vm obtained through performing weighted average on memory utilization ratios of all physical machines in a scheduling domain according to a size of a memory mi of each physical machine;

a load alarm value $\delta m = b + Vm$, where b is a customized constant, and $Vm = (\Sigma lmi \ast mi)/\Sigma mi$;

Definition (3) A network utilization ratio ln of a physical machine is defined as: an average network utilization ratio of the physical machine in a period of time t;

a network load mean value Vn is defined as: a mean value Vn obtained through performing weighted average on network utilization ratios of all physical machines in a scheduling domain according to a size of a network bandwidth ni of each physical machine;

a load alarm value $\delta n = b + Vn$, where b is a customized constant, and $Vn = (\Sigma lni \ast ni)/\Sigma ni$;

Definition (4) A comprehensive load M of a physical machine is defined as: a comprehensive load is a six-dimensional vector, $Mi = (ci, mi, bi, lci, lmi, lni)$, where ci represents computing capability (a CPU clock speed Ghz or an equivalent scale may be used) of a CPU of a physical server i, mi represents an overall size (Giga byte may be used as a unit scale) of the memory of the physical server i, bi represents an external overall bandwidth (Mbps may be used as a unit scale) of the physical server i, (lci, lmi, lni) respectively represent a mean value of a utilization ratio of the CPU, the memory and a network bandwidth of the physical server i in a previous period of time t; and (5) Residual (CPU, memory, network) capability of a physical server=overall (CPU, memory, network) capability of the physical server−occupied (CPU, memory, network)

capability of the physical server, where the residual capability may be calculated from the comprehensive load six-dimensional vector defined in (4).

Figure 2:
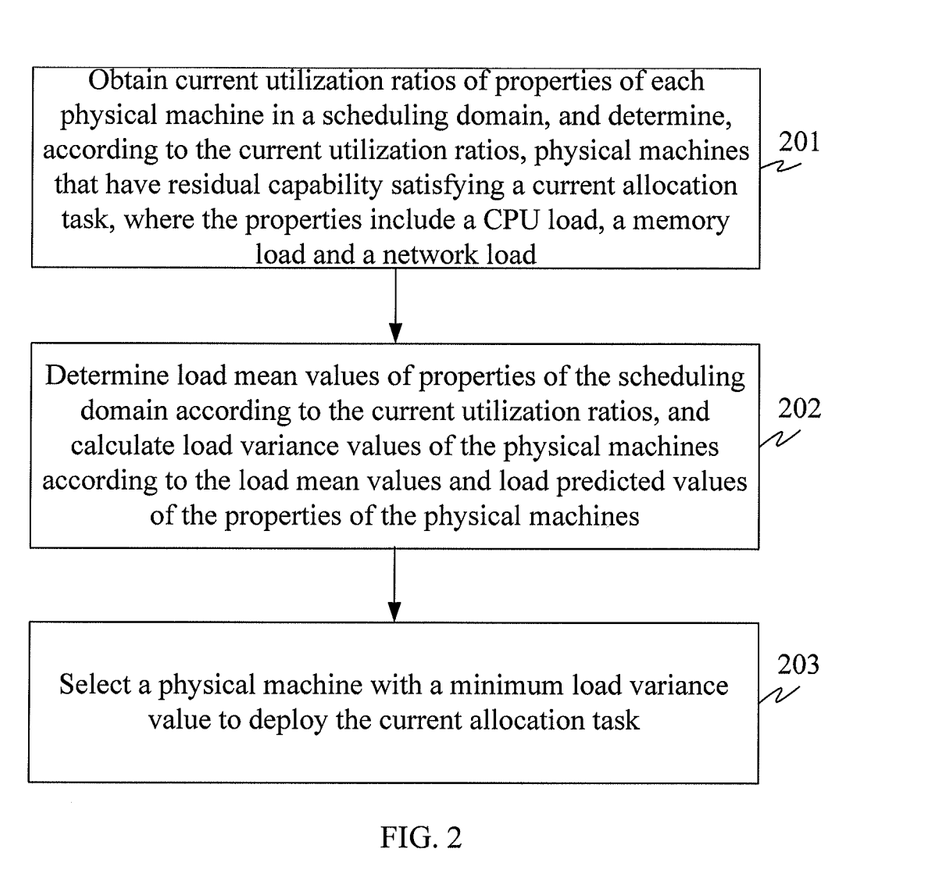
FIG. 2 is a flow chart of a method for implementing load balance of data center resources according to an embodiment of the present disclosure.

As shown in FIG. 2, an embodiment of the present disclosure provides a method for implementing load balance of data center resources, and the solution includes:

Step 201: Obtain current utilization ratios of properties of each physical machine in a scheduling domain, and determine, according to the current utilization ratios, physical machines that have residual capability satisfying a current allocation task, where the properties include a CPU load, a memory load and a network load.

Step 202: Determine load mean values of properties of the scheduling domain according to the current utilization ratios, and calculate load variance values of the physical machines according to the load mean values and load predicted values of the properties of the physical machines.

Step 203: Select a physical machine with a minimum load variance value to deploy the current allocation task.

It can be seen that, actual residual capability of the current physical machines can be fully acquired through obtaining the current utilization ratios of the properties of each physical machine in the scheduling domain, and meanwhile, because during the procedure of selecting the physical machine for deployment, a minimum mean variance method is used to solve the problem of load imbalance caused by different specification requirements.

According to an embodiment of the present disclosure, the determining, according to the current utilization ratios, the physical machines that have the residual capability satisfying the current allocation task in step 201 includes:

(1) Use a difference value of overall load capability of properties of each physical machine in the scheduling domain and the current utilization ratios of the properties of each physical machine as residual capability of the properties of each physical machine; and (2) Compare the residual capability with a specification of the current allocation task to determine physical machines that have the residual capability greater than or equal to the specification of the current allocation task.

It should be noted that, the overall load capability of the properties of the physical machine in the embodiment of the present disclosure refers to an overall size of CPU, memory and network of the physical machine, and a current utilization ratio of the CPU of each physical machine refers to a mean value of an actual CPU utilization ratio of the CUP of each physical machine. The residual capability of each physical machine may be calculated by using the formula of the residual capability defined in the definition (5).

For example, if overall load capability of a physical machine PM1 is (4CU, 3G, 100M), a current utilization ratio of the memory of the physical machine is 50%, a current utilization ratio of the network is 10%, and the physical machine includes 4 CPUs, where an actual utilization ratio of a first CPU is 30%, an actual utilization ratio of a second CPU is 30%, an actual utilization ratio of a third CPU is 40%, and an actual utilization ratio of a fourth CPU is 20%, the current utilization ratio of the CPU of the physical machine is (30%+30%+40%+20%)14=30%.

The comprehensive load form of the physical machine, where the comprehensive load form of the physical machine is proposed in the definition (4), represents a comprehensive load PM1 of the physical machine, and a specific form is as follows:

$$PM1=(4CU, 3G, 100M, 30\%, 50\%, 10\%), \text{ and}$$

$$\text{residual capability of the properties of PM1}=(4*(1-30\%), 3*(1-50\%), 100*(1-10\%))=(2.8, 1.5, 90).$$

The residual capability of PM1 is compared with the specification of the current allocation task to determine whether the residual capability satisfies the current allocation task, for example, the current allocation task is (2, 1, 10), and then the residual capability of PM1 satisfies the current allocation task.

According to an embodiment of the present disclosure, the determining the load mean values of the properties of the scheduling domain according to the current utilization ratios, and calculating the load variance values of the physical machines according to the load mean values and load predicted values of the properties of the physical machines in step 202 specifically includes:

(1) For the physical machines satisfying the current allocation task, predict utilization ratios of the properties of the physical machines after a virtual machine is deployed, and obtain the load predicted values; and (2) Calculate and obtain the load variance value according to the load mean values and the load predicted values; a calculation formula of the load variance value is as follows:

$$D=(a\%-x)2+(b\%-y)2+(c\%-z)2$$

where, a%, b% and c% are load predicted values of the CPU, memory and network obtained after the virtual machine is deployed for the physical machine, and x, y and z are respectively a current CPU load mean value, a memory load mean value and a network load mean value in the scheduling domain.

Specifically, the load mean values Vc, Vm, Vn of the properties in the scheduling domain may be calculated and obtained according to the obtained current utilization ratios lc, lm, ln of the properties through the method described in the definitions (1), (2) and (3).

When the utilization ratios of the properties of the physical machines after the virtual machine is deployed are predicted, a predetermined rule needs to be abided by in the embodiment of the present disclosure, where the predetermined rule includes:

When it is predicted to deploy the virtual machine, for a physical server where the virtual machine is located, a comprehensive load of the physical server needs to be increased, so the predicted values of the properties of the virtual machine are always calculated according to a maximum share required by the properties (CPU, memory, network) of the virtual machine, so as to reserve enough resources. Meanwhile, if it is found that the virtual machine does not use up the required maximum share after observation for a period of time t, a dynamic adjustment is performed when allocating the virtual machine again.

That is to say, for a physical machine, the predicted value of the CPU=the current utilization ratio of the CPU+(the CPU occupied by the virtual machine/the overall CPU of the physical machine)*100%; the predicted value of the memory=the current utilization ratio of the memory+(the memory occupied by the virtual machine/the overall memory of the physical machine)*100%; and the predicted value of the network=the current utilization ratio of the network+(a network load occupied by the virtual machine/an overall network load of the physical machine)*100%.

According to an embodiment of the present disclosure, the method may further include:

Determine whether the current allocation task is a single virtual machine task.

When the current allocation task is a single virtual machine task, the physical machines in the scheduling domain are arranged into an n*(m+2) matrix, where m=MAX (the number of CPUs of a single physical machine), each row of the matrix indicates a utilization ratio of each CPU of every physical machine in a period of time, a memory utilization ratio of every physical machine in a period of time and a network utilization ratio of every physical machine in a period of time, and each column indicates each physical machine in the scheduling domain.

When the current allocation task is a non-single virtual machine task, the physical machine clusters in the scheduling domain are arranged into an n*3 matrix, where each row of the matrix indicates a CPU utilization ratio of a physical machine cluster in a period of time, a memory utilization ratio of a physical machine cluster in a period of time and a network utilization ratio of a physical machine cluster in a period of time, and each column indicates each physical machine cluster in the scheduling domain.

It should be noted that, because in the embodiment of the present disclosure, a two-dimensional mesh algorithm is used to determine an optimal physical machine to deploy the virtual machine, property information of each physical machine needs to be arranged into a matrix form. When the two-dimensional mesh algorithm is used, a weighted variance of each property of every physical machine is calculated through each row of the two-dimensional mesh in a parallel manner to form a column of values, and then the values are sorted in each column to find a physical machine with the minimum variance value for deployment.

Because the physical machine cluster belongs to a special service, a current utilization ratio of the CPU in the cluster is indicated by using a capability value, where the capability value is a mean value of the values of the actual CPU capability of all the physical machines in the cluster.

According to an embodiment of the present disclosure, in step 203, the selecting the physical machine with the minimum load variance value to deploy the current allocation task includes:

When the current allocation task is a single virtual machine task, a physical machine with the minimum load variance value in the physical machines satisfying the current allocation task is selected for deployment.

When the current allocation task is a non-single virtual machine task, a physical machine with the minimum load variance value in the physical machine clusters satisfying the current allocation task is selected for deployment.

When the number of physical machines with the minimum load variance value or the number of physical machine clusters with the minimum load variance value is more than 1, one physical machine or physical machine cluster is randomly selected to deploy the current allocation task.

According to an embodiment of the present disclosure, the method may further include:

(1) Monitor the utilization ratios of the properties of each physical machine in the scheduling domain;

(2) When a physical machine with a utilization ratio of a property, where the utilization ratio of the property exceeds a predetermined value, triggers an alarm for removing, determine to remove the virtual machine on the physical machine according to a difference value of an alarm value of the property and a load mean value of the property in the scheduling domain; and (3) Search a physical machine to deploy the removed virtual machine.

Specifically, in the embodiment of the present disclosure, when one or more of the properties such as CPU, memory, network of a certain physical machine in the scheduling domain exceed respective alarm values $\delta$, an alarm removing procedure is triggered. For example, when a CPU of a certain physical machine gives an alarm, a load mean value of the CPU in the scheduling domain is subtracted from a load value of the CPU that currently gives the alarm to obtain a difference value, the difference value is compared with CPU utilization ratios of all virtual machines on the physical machines to decide which virtual machines are removed. Specifically, when at least one of the CPU utilization ratio of the current virtual machine is greater than or equal to the difference value, one or more virtual machines need to be removed, and then the difference value is re-calculated and it is determined whether an alarm still exists in the CPU of the physical machine. If the alarm still exists, continue to remove the virtual machine.

According to an embodiment of the present disclosure, the searching the physical machine to deploy the removed virtual machine further includes:

Determine, according to the current utilization ratios of each physical machine, physical machines that have the residual capability satisfying the allocation task of the removed virtual machine.

Determine load mean values of the properties in the scheduling domain according to the current utilization ratios of each physical machine, and calculate load variance values of the physical machines according to the load mean values and load predicted values of the properties of the physical machines.

Select a physical machine with a minimum load variance value to deploy the current allocation task.

It should be noted that, in the embodiment of the present disclosure, the procedure of deploying the removed virtual machine is the same as that of deploying the allocation task described in steps 201, 202, and 203. That is to say, after the alarm processing, it is required to re-determine one or more physical machines to deploy the task of the removed virtual machine. Therefore, reference may be made to relevant content in the foregoing steps 201, 202, and 203 for the procedure of determining the physical machine to deploy the removed virtual machine, which is not repeatedly described here.

According to an embodiment of the present disclosure, the method may further include:

(1) Determine an ID of a physical machine requiring an optimization operation;

(2) Compare a difference value of a current utilization ratio of each property of the physical machine and an optimization objective value with a utilization ratio of a property of each virtual machine on the physical machine, so as to determine the virtual machine to be removed; and (3) Select a physical machine to deploy the removed virtual machine.

It should be noted that, the optimization objective value in the optimization procedure is preset according to experience of an administrator, and meanwhile, the procedure and objective of comparing the difference value of the current utilization ratio and the optimization objective value with the utilization ratio of each property of the virtual machine to remove the virtual machine are similar to those of the solution of removing the virtual machine in the foregoing alarm processing procedure. For example, likewise, when at least one of the CPU utilization ratio of the current virtual machine is greater than or equal to the difference value, one or more virtual machines need to be removed, and then the difference value is re-calculated till it is determined that the CPU of the virtual machine is less than the difference value, and finally, the procedure of removing the virtual machine ends.

According to an embodiment of the present disclosure, the selecting the physical machine to deploy the removed virtual machine further includes:

Determine, according to the current utilization ratios of each physical machine, the physical machines that have the residual capability satisfying the allocation task of the removed virtual machine;

Determine load mean values of the properties in the scheduling domain according to the current utilization ratios of each physical machine, and calculate load variance values of the physical machines according to the load mean values and load predicted values of the properties of the physical machines; and Select a physical machine with a minimum load variance value to deploy the current allocation task.

It should be noted that, in the embodiment of the present disclosure, the procedure of deploying the removed virtual machine is the same as that of deploying the allocation task described in steps 201, 202, and 203. That is to say, after the optimization operation, it is required to re-determine one or more physical machines to deploy the task of the removed virtual machine. Therefore, reference may be made to relevant content in steps 201, 202, and 203 for the procedure of determining the physical machine to deploy the removed virtual machine, which is not repeatedly described here.

It should be noted that, the foregoing embodiments respectively describe three processing procedures of the method for implementing load balance of the data center resources:

(1) a procedure of allocating the current task; (2) a procedure of processing alarm removing; (3) an optimization operation procedure.

According to the embodiments of the present disclosure, a processing priority is set for the three processing procedures respectively, where the priority of the procedure (2) is greater than that of the procedure (3), and the priority of the procedure (3) is greater than that of the procedure (1). The foregoing three procedures may be executed according to the sequence of the priority, but the embodiments of the present disclosure do not limit the sequence of the priority.

Figure 3:
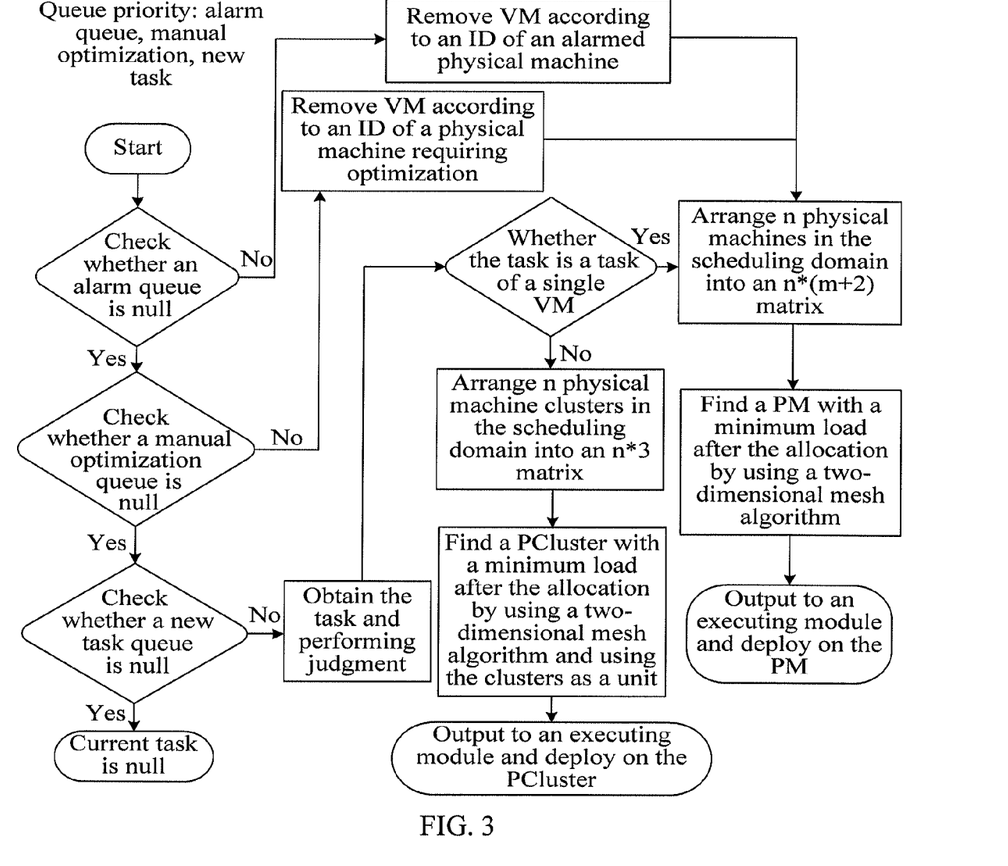
FIG. 3 is a specific flow chart of a method for implementing load balance of data center resources according to an embodiment of the present disclosure.

As shown in FIG. 3, a specific flow chart of executing the solutions of the embodiments of the present disclosure according to the priority is illustrated.

First, determine whether an alarm removing queue includes an alarm task to be processed, if an alarm removing queue includes an alarm task to be processed, the alarm removing procedure described in the foregoing embodiment is implemented; if an alarm removing queue does not include an alarm task to be processed, determine whether an optimization queue includes an optimization task to be processed.

If the optimization queue includes the optimization task to be processed, the optimization processing procedure described in the foregoing embodiment is implemented; if the optimization queue does not include the optimization task to be processed, continue to determine whether a new task queue includes an allocation task to be processed.

When the new task queue includes the allocation task to be processed, the task allocation procedure described in the foregoing embodiment is implemented; when the new task queue does not include the allocation task to be processed, an instruction indicating that the current task is null is output.

A specific algorithm of the method for implementing load balance of the data center resources according to the embodiment of the present disclosure in actual application is as follows:

```
(1) checkAlertQueue( ); (maximum priority)
(2) if(AlertQueue!=null)
(3) {
(4)             allocTask(FirstTask);
(5)             getdownVM(PMID)
(6)             {
(7)             //calculating a current load exceeding value
(8)         getValue=PMLoad-δ;
(9)             //calculating and obtaining which VMs are removed
(10) ObtainVM(getValue);
(11)            }
(12) //obtaining a physical machine matrix
(13) matrix[ ][ ]=getMatrix(PM[n]);
(14)            //searching a PM with a minimum load mean value through a
two-dimensional mesh algorithm
(15) Algorithm 2D-mesh(matrix[ ][ ])
(16) {
(17)                For(i=1;i<=m+2;i++)
(18)                   For (AllCPU)
(19)                      ComputeLoad( );
(20)                   For (j=1;j<=n;j++)
(21)                      BubbleSort(PMLoadi);
(22)        }
(23)        r eturn PM;
(24) }
(25)Else
(26)        {
(27)     checkOptimQueue( ); (priority is inferior to the alarm queue)
(28)     i f(OptimQueue!=null)
(29)    {
(30)        allocTask(FirstTask);
(31)        getdownVM(PMID)
(32)        {
(33)           //calculating a current load exceeding value
(34)           getValue=PMLoad-EndLoad;
(35)           //calculating and obtaining which VMs are removed
(36)           ObtainVM(getValue);
```

```
(37)                  }
(38)                  //obtaining a physical machine matrix
(39)                  matrix[ ][ ]=getMatrix(PM[n]);
(40)                  //searching a PM with a minimum load mean value through a
two-dimensional mesh algorithm
(41)                  Algorithm 2D-mesh(matrix[ ][ ])
(42)                  {
(43)                      For(i=1;i<=m+2;i++)
(44)                          For(AllCPU)
(45)                              Compu teLoad( );
(46)                      For (j=1;j<=n;j++)
(47)                              BubbleSort(PMLoadi);
(48)                  }
(49)                  return PM;
(50)             }
(51)         El se
(52)         {
(53)             checkTaskAllocQueue( ); (minimum priority)
(54)             if(TaskAllocQueue!=null)
(55)             {
(56)                 allocTask(FirstTask);
(57)                 sw itch(tasktype)
(58)                 {
(59)                     case(SingleVMTask):
(60)                     {
(61)                         // obtaining a physical machine matrix
(62)                         m atrix[ ][ ]=getMatrix(PM[n]);
(63)                         //searching a PM with a minimum load mean value
through a two-dimensional mesh algorithm
(64)                         Algorithm 2D-mesh(matrix[ ][ ])
(65)                         {
(66)                             For (i=1;i<=m+2;i++)
(67)                                 For (AllCPU)
(68)                                     Compu teLoad( );
(69)                             For(j=1;j<=n;j++)
(70)                                 Bubbl eSort(PMLoadi);
(71)                         }
(72)                         re turn PM;
(73)                     }
(74)                     case(ClusterTask):
(75)                     {
(76)                         // obtaining a physical machine cluster matrix
(77)                         m atrix[ ][ ]=getMatrix(PCluster[n]);
(78)                         //searching a PCluster with a minimum load mean value
through a two-dimensional mesh algorithm
(79)                         Algorit hm 2D-mesh(matrix[ ][ ])
(80)                         {
(81)                             For(i=1;i<=m+2;i++)
(82)                                 For(All PCluster)
(83)                                     ComputeLoad( );
(84)                             For(j=1;j<=n;j++)
(85)                                 BubbleSort(PCluster Loadi);
(86)                         }
(87)                         re turn PCluster;
(88)                     }
(89)                     default:
(90)                         re turn Error;
(91)                 }
(92)             }
(93)             Else
(94)             {
(95)                 return NoTask;
(96)         }
(97)     }
(98) }
```

Figure 4:
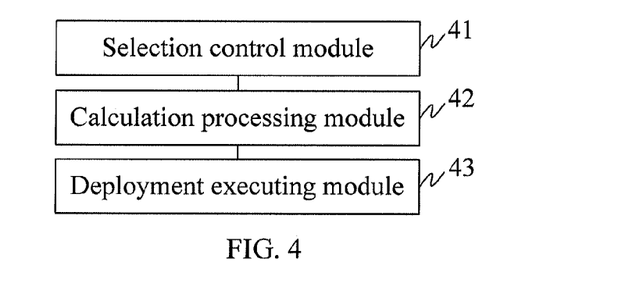
FIG. 4 is a schematic structural diagram of a device for implementing load balance of data center resources according to an embodiment of the present disclosure.

As shown in FIG. 4, on the basis of the method embodiment in FIG. 2, an embodiment of the present disclosure provides a device for implementing load balance of data center resources, where the device includes:

a selection control module 41, configured to obtain current utilization ratios of properties of each physical machine in a scheduling domain, and determine, according to the current utilization ratios, physical machines that have residual capability satisfying a current allocation task, where the properties include a CPU load, a memory load and a network load;

a calculation processing module 42, configured to determine load mean values of properties of the scheduling domain according to the current utilization ratios, and calculate load variance values of the physical machines according to the load mean values of the properties of the scheduling domain and load predicted values of the properties of the physical machines; and a deployment executing module 43, configured to select a physical machine with a minimum load variance value to deploy the current allocation task.

Figure 5:
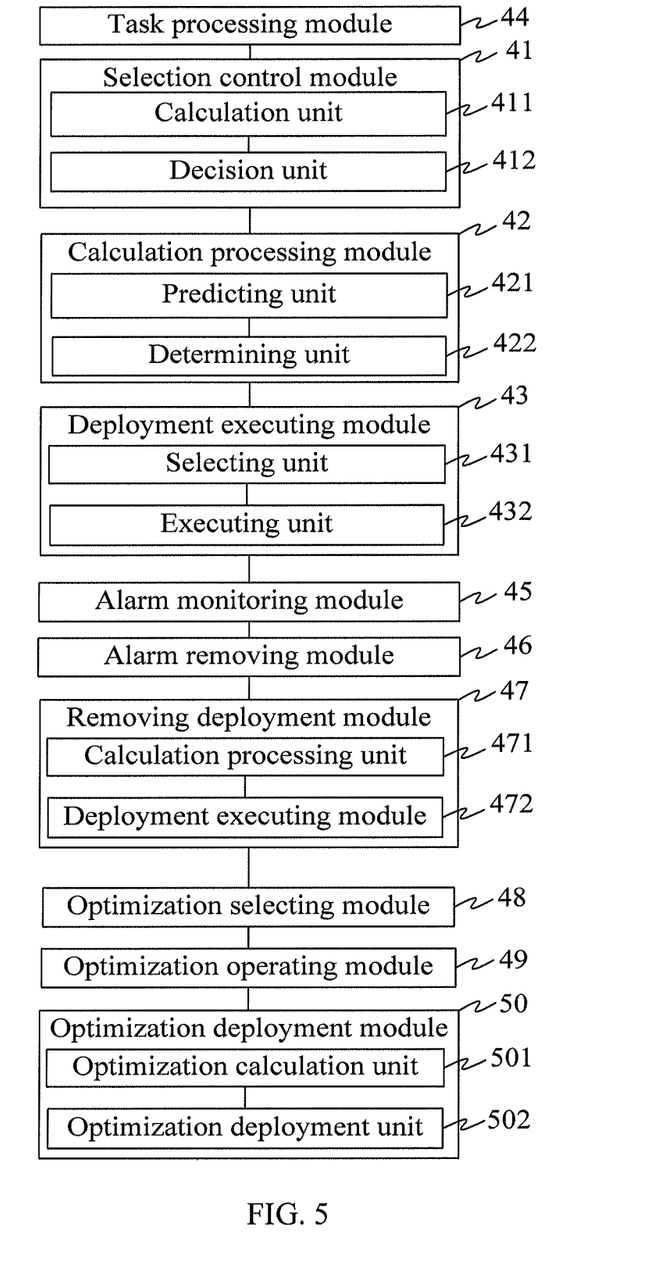
FIG. 5 is a specific schematic structural diagram of a device for implementing load balance of data center resources according to an embodiment of the present disclosure.

As shown in FIG. 5, according to an embodiment of the present disclosure, the selection control module 41 may include:

a calculation unit 411, configured to use a difference value of overall load capability of the properties of each physical machine in the scheduling domain and the current utilization ratios of the properties of each physical machine as residual capability of the properties of each physical machine; and a decision unit 412, configured to compare the residual capability with a specification of the current allocation task to determine the physical machines that have the residual capability greater than or equal to the specification of the current allocation task.

According to an embodiment of the present disclosure, the calculation processing module 42 may include:

a predicting unit 421, configured to predict utilization ratios of the properties of the physical machines after a virtual machine is deployed for the physical machines satisfying the current allocation task, and obtain load predicted values; and a determining unit 422, configured to calculate and obtain the load variance value according to the load mean values and the load predicted values, where a calculation formula of the load variance value is as follows:

$$D = (a\% - x)2 + (b\% - y)2 + (c\% - z)2$$

where, a%, b% and c% are load predicted values of the CPU, memory and network obtained after the virtual machine is deployed for the physical machine, x, y and z are respectively a current CPU load mean value, a memory load mean value and a network load mean value in the scheduling domain.

According to an embodiment of the present disclosure, the device may further include:

a task processing module 44, configured to determine whether the current allocation task is a single virtual machine task.

When the current allocation task is a single virtual machine task, the physical machines in the scheduling domain are arranged into an n*(m+2) matrix, where m=MAX (the number of CPUs of a single physical machine), each row of the matrix indicates a utilization ratio of each CPU of every physical machine in a period of time, a memory utilization ratio of every physical machine in a period of time and a network utilization ratio of every physical machine in a period of time, and each column indicates each physical machine in the scheduling domain.

When the current allocation task is a non-single virtual machine task, physical machine clusters in the scheduling domain are arranged into a n*3 matrix, where each row of the matrix indicates a CPU utilization ratio of a physical machine cluster in a period of time, a memory utilization ratio of a physical machine cluster in a period of time and a network utilization ratio of a physical machine cluster in a period of time, and each column indicates each physical machine cluster in the scheduling domain.

According to an embodiment of the present disclosure, the deployment executing module 43 may include:

a selecting unit 431, configured to determine whether the number of physical machines with the minimum load variance value or the number of physical machine clusters with the minimum load variance value is more than 1; and an executing unit 432, configured to, when the number of physical machines or the number of physical machine clusters is one, select a physical machine with the minimum load variance value or a physical machine cluster with the minimum load variance value in the physical machines or the physical machine clusters for deployment, where the physical machines or the physical machine clusters satisfy the current allocation task; and when the number of physical machines or the number of physical machine clusters is more than one, randomly select a physical machine or physical machine cluster to deploy the current allocation task.

According to an embodiment of the present disclosure, the device may further include:

an alarm monitoring module 45, configured to monitor the utilization ratios of the properties of each physical machine in the scheduling domain;

an alarm removing module 46, configured to, when a physical machine with a utilization ratio of a property, where the utilization ratio of the property exceeds a predetermined value, triggers an alarm for removing, determine to remove the virtual machine on the physical machine according to a difference value of an alarm value of the property and a load mean value of the property in the scheduling domain; and a removing deployment module 47, configured to search a new physical machine to deploy the removed virtual machine.

According to an embodiment of the present disclosure, the removing deployment module 47 may further include:

a calculation processing unit 471, configured to determine, according to the current utilization ratios of each physical machine, physical machines that have residual capability satisfying the allocation task of the removed virtual machine; and determine load mean values of properties of the scheduling domain according to the current utilization ratios of each physical machine, and calculate load variance values of the physical machines according to the load mean values of the properties of the scheduling domain and load predicted values of the properties of the physical machines; and a deployment executing module 472, configured to select a new physical machine with a minimum load variance value to deploy the current allocation task.

According to an embodiment of the present disclosure, the device may further include:

an optimization selecting module 48, configured to determine an ID of a physical machine requiring an optimization operation;

an optimization operating module 49, configured to compare a difference value of a current utilization ratio of each property of the physical machine and an optimization objective value with a utilization ratio of a property of each virtual machine on the physical machine, so as to determine the virtual machine to be removed; and an optimization deployment module 50, configured to select a new physical machine to deploy the removed virtual machine.

According to an embodiment of the present disclosure, the optimization deployment module 50 further includes:

an optimization calculation unit 501, configured to determine, according to the current utilization ratios of each physical machine, physical machines that have residual capability satisfying the allocation task of the removed virtual machine; and determine load mean values of properties of the scheduling domain according to the current utilization ratios of each physical machine, and calculate load variance values of the physical machines according to the load mean values and load predicted values of the properties of the physical machines; and an optimization deployment unit 502, configured to select a physical machine with a minimum load variance value to deploy the current allocation task.

It should be noted that, the device embodiment described in the present disclosure is obtained on the basis of the method embodiment in FIG. 2, and each functional module corresponds to each step in the method embodiment in FIG. 2.

Therefore, the device embodiment described in the present disclosure includes the features same as or corresponding to those in the method embodiment in FIG. 2, and the solutions involved in the device embodiment of the present disclosure is described in the embodiment in FIG. 2, which is not repeatedly described here.

The solutions of the present disclosure are further described in the following with reference to specific examples, and are illustrated by taking the new task allocation procedure in the three processing procedures as an example.

A task for allocating a virtual machine is as follows:

Input the task: the virtual machine deploys task specifications VMx: 2CU (two CPU calculation capability units), 1G memory, 10M bandwidth, where the task specifications may be indicated as (2, 1, 10).

Step 100: Obtain current utilization ratios of properties of each physical machine in a scheduling domain.

Specifically, three physical machines are set in the scheduling domain, overall load capability of a PM1 is 4CU, 30G, 100M, and obtained actual utilization ratios of the 4 CPUs is respectively 30%, 30%, 30%, 20%. Therefore, a current utilization ratio of the CPU obtained according to the actual utilization ratios is 30%, an obtained current utilization ratio of the memory is 50%, and a current utilization ratio of the network is 10%.

Overall load capability of a PM2 is 6CU, 3G, 100M, and obtained actual utilization ratios of the 6 CPUs is respectively 10%, 10%, 5%, 10%, 10%, 15%. Therefore, a current utilization ratio of the CPU obtained according to the actual utilization ratios is 10%, an obtained current utilization ratio of the memory is 10%, and a current utilization ratio of the network is 30%.

Overall load capability of a PM3 is 2CU, 2G, 100M, and obtained actual utilization ratios of the 2 CPUs is respectively 70%, 70%. Therefore, a current utilization ratio of the CPU obtained according to the actual utilization ratios is 70%, an obtained current utilization ratio of the memory is 60%, and a current utilization ratio of the network is 40%.

To more clearly express a comprehensive load state of the PM1, the comprehensive load capability of the three physical machines are expressed as follows by using the definition (4):

PM1=(4CU, 3G, 100M, 30%, 50%, 10%)

PM2=(6CU, 3G, 100M, 10%, 10%, 30%)

PM3=(2CU, 2G, 100M, 70%, 60%, 40%)

Step 200: Determine, according to the current utilization ratios, physical machines that have residual capability satisfying a current allocation task.

Specifically, n physical machines in the scheduling domain are arranged into an n×(m+2) matrix (m=MAX (the number of CPUs of a single physical machine)), each row of the matrix indicates an actual utilization ratio of each CPU of the physical machine in a period of time (for example, a period of time t), the current utilization ratio of the memory of the physical machine in a period of time (for example, a period of time t) and the current utilization ratio of the network of the physical machine in a period of time (for example, a period of time t); and each column indicates all physical machines in the scheduling domain.

In this embodiment, n=3, m=6, and therefore, the matrix is indicated as follows:

PM1 30% 30% 40% 20% * * 50% 10%
PM2 10% 10% 5% 10% 10% 15% 10% 30%
PM3 70% 70% * * * * 60% 40%, where places of the symbol * indicate that the corresponding places are null.

The residual capability of the three physical machines is determined through a two-dimensional mesh algorithm.

First, the formula: residual capability=overall capability−occupied capability in the definition (5) is used to calculate residual capability of all the physical machines:

PM1=(4*(1-30%), 3*(1-50%), 100*(1-10%))=(2.8, 1.5, 90);

PM2=(6*(1-10%), 3*(1-10%), 100*(1-30%))=(5.4, 2.7, 70);

PM3=(2*(1-70%), 2*(1-60%), 100*(1-40%))=(0.6, 0.8, 60);

By comparison with the input task specification (2, 1, 10), it is determined that the residual capability (CPU, memory) of the PM3 is insufficient, and merely the residual capability of the PM1 and the residual capability of the PM2 are sufficient.

Step 300: Determine load mean values of properties of the scheduling domain according to the current utilization ratios.

Specifically, the CPU load mean value Vc, the memory load mean value Vm and the network load mean value Vn in the scheduling domain are calculated and obtained by using the algorithms proposed in the definitions (1), (2), and (3):

specifically, $Vc=(\Sigma lci*nui)/\Sigma nui=40\%$ $Vm=(\Sigma lmi*mi)/\Sigma mi=50\%$ $Vn=(\Sigma lni*ni)/\Sigma ni=20\%$.

Step 400: Calculate load variance values of the physical machines according to the load mean values and load predicted values of the properties of the physical value.

Specifically, the load variance value is calculated obtained through $D=(a\%-x)2+(b\%-y)2+(c\%-z)2$, where a%, b% and c% are the utilization ratio of the CPU, memory and network after the virtual machine is predicted and deployed, x, y and z are a current CPU load mean value Vc, a memory load mean value Vm, and a network load mean value Vn in the scheduling domain.

When the load predicted values after the physical machine deploys the virtual machine are predicted, the predication is performed according to a predication rule proposed in the foregoing embodiment, and the maximum share required by the virtual machine (CPU, memory, network) is always considered for calculation, so as to reserve enough resources. Meanwhile, if it is found that the virtual machine does not use up the required maximum share after observation for a period of time t, dynamic adjustment is performed when allocating the virtual machine again.

A procedure of calculating the load variance value D1 of the first physical machine PM1 is as follows:

PM1=(4CU, 2G, 100M, 30%, 50%, 10%);

calculating a predicted value of the CPU utilization ratio after the virtual machine is placed: a%=30%+(2/4)*100%=80%;

a predicted value of the memory utilization ratio: b%=50%+(1/3)*100%=83%;

a predicted value of the network utilization ratio: c%=10%+(10/100)*100%=20%;

$D1=(80\%-40\%)2+(83\%-50\%)2+(20\%-20\%)2=0.2689.$

A procedure of calculating the load variance value D2 of the second physical machine PM2 is as follows:

PM2=(6CU, 3G, 100M, 10%, 10%, 30%);

calculating a predicted value of the CPU utilization ratio after the virtual machine is placed: a%=10%+(2/6)*100%=43%;
a predicted value of the memory utilization ratio: b%=10%+(1/3)*100%=43%;
a predicted value of the network utilization ratio: c%=30%+(10/100)*100%=40%;

$$D2=(43\%-40\%)^2+(43\%-50\%)^2+(40\%-20\%)^2=0.0458.$$

Step 500: Two sub-sums D1 and D2 are generated through the previous parallel calculation and to form a column, one-dimensional sorting is performed on the column to search a proper physical machine with a minimum value of D, where the sorting result here is the PM2, that is, the PM2 is selected to be used as the physical machine for deployment.

Step 600: When it is found that the values of D in several physical machines are the same, it considers that the values are equivalent, and then a PMx is randomly selected as the physical machine for deployment.

Step 700: Output an allocation result: the allocation task of the virtual machine is deployed to the physical machine PM2.

It can be known from the foregoing embodiment that, in the embodiment of the present disclosure, because it is difficult to solve the problem of load imbalance of the physical servers, where the load imbalance of the physical servers is caused by the inconsistency of the user requirements and the specifications of the physical servers, by using the commonly-used load balance scheduling algorithm currently, the present disclosure provides a load balance algorithm according to dynamic load feedback adjustment. Through obtaining the current utilization ratios of the properties of the physical machines, the actual residual capability of each physical machine can be correctly obtained. Through predicting the properties after the virtual machine is deployed for the physical machines, the load states of the physical machines after the virtual machine is deployed can be well obtained, and the optimal physical machine is selected for deployment, so as to ensure the load balance of each physical machine. The physical machine enabling the highest load balance of the system can be more objectively found out for deployment, thus solving the problem of the load imbalance caused by the inconsistency of the specification requirements and the specifications of the servers.

Those of ordinary skill in the art should understand that all or part of the steps of the method according to the foregoing embodiments may be implemented by a program instructing relevant hardware. The program may be stored in a computer readable storage medium. When the program is executed, the steps of the method according to the foregoing embodiments are performed. The storage medium may be a magnetic disk, an optical disk, a Read-Only Memory (Read-Only Memory, ROM), or a Random Access Memory (Random Access Memory, RAM).

What is claimed is:

1. A method for implemented load balance of data center resources, wherein the method is implemented in a server having a processor, comprising:
obtaining current utilization ratios of properties of each physical machine in a scheduling domain, wherein the properties comprise a CPU load, a memory load, and a network load;
determining, according to the current utilization ratios, physical machines that have residual capability satisfying a current task for allocating a virtual machine;
determining load mean values of properties of the scheduling domain according to the current utilization ratios, and calculating load variance values of the physical machines according to the load mean values of the properties of the scheduling domain and load predicted values of the properties of the physical machines wherein calculating the load variance values of the physical machines according to the load mean values of the properties of the scheduling domain and the load predicted values of the properties of the physical machines comprises:
for the physical machines satisfying the current task for allocating the virtual machine, predicting the utilization ratio of the properties of the physical machines after the virtual machine is deployed for the physical machines, and obtaining the load predicted value, and
calculating and obtaining the load variance value according to the load mean values and the load predicted values, wherein a calculation formula of the load variance value is as follows:

$$D=(a\%-x)^2+(b\%-y)^2+(c\%-z)^2$$

wherein a%, b% and c% are load predicted values of the CPU, memory and network obtained after the virtual machine is deployed for the physical machine, x, y and z are respectively a current CPU load mean value, a memory load mean value and a network load mean value in the scheduling domain; and
selecting a physical machine with a minimum load variance value to deploy the current allocation task.

2. The method according to claim 1, wherein determining, according to the current utilization ratios, the physical machines that have the residual capability satisfying the current task for allocating the virtual machine comprises:
using a difference value of overall load capability of properties of each physical machine in the scheduling domain and the current utilization ratios of the properties of each physical machine as residual capability of the properties of each physical machine; and
comparing the residual capability with a specification of the current task for allocating the virtual machine to determine the physical machines that have the residual capability greater than or equal to the specification of the current task for allocating the virtual machine.

3. The method according to claim 1, further comprising:
determining whether the current task for allocating the virtual machine is a single virtual machine task;
when the current task is a single virtual machine task, arranging the physical machines in the scheduling domain into an n*(m+2) matrix, wherein m=MAX (the number of CPUs of a single physical machine), each row of the matrix indicates a utilization ratio of each CPU of every physical machine in a period of time, a memory utilization ratio of every physical machine in a period of time and a network utilization ratio of every physical machine in a period of time, and each column indicates each physical machine in the scheduling domain; and
when the current task for allocating the virtual machine is a non-single virtual machine task, arranging the physical machine clusters in the scheduling domain into an n*3 matrix, wherein each row of the matrix indicates a CPU utilization ratio of a physical machine cluster in a period of time, a memory utilization ratio of a physical machine cluster in a period of time and a network utilization ratio of a physical machine cluster in a period of time, and each column indicates each physical machine cluster in the scheduling domain.

4. The method according to claim 3, wherein selecting the physical machine with the minimum load variance value to deploy the current task for allocating the virtual machine comprises:
- when the current task for allocating the virtual machine is a single virtual machine task, selecting a physical machine with a minimum load variance value in the physical machines satisfying the current task for deployment;
- when the current task for allocating the virtual machine is a non-single virtual machine task, selecting a physical machine with a minimum load variance value in the physical machine cluster satisfying the current task for deployment; and
- when the number of physical machines with the minimum load variance value or the number of physical machine clusters with the minimum load variance value is more than 1, one physical machine or physical machine cluster is randomly selected to deploy the current task.

5. The method according to claim 1, further comprising:
- monitoring the utilization ratios of the properties of each physical machine in the scheduling domain;
  - when a utilization ratio of the property exceeds a predetermined alarm value, triggering an alarm for removing and determining to remove the virtual machine on the physical machine according to a difference between the predetermined alarm value and a load mean value of the property in the scheduling domain; and
  - searching a new physical machine to deploy the removed virtual machine.

6. The method according to claim 5, wherein searching the new physical machine to deploy the removed virtual machine further comprises:
- determining, according to the current utilization ratio of each physical machine, the physical machines that have residual capability satisfying the task of the removed virtual machine;
- determining load mean values of the properties in the scheduling domain according to the current utilization ratio of each physical machine, and calculating load variance values of the physical machines according to the load mean values of the properties of the scheduling domain and the load predicted values of the properties of the physical machines; and
- selecting a new physical machine with a minimum load variance value to deploy the current task of the removed virtual machine.

7. The method according to claim 1, further comprising:
- determining an identification of a physical machine requiring an optimization operation;
- comparing a difference between a current utilization ratio of each property of the physical machine requiring the optimization operation and an optimization objective value with a utilization ratio of a property of each virtual machine on the physical machine, so as to determine the virtual machine to be removed; and
- selecting a new physical machine to deploy the removed virtual machine.

8. The method according to claim 7, wherein selecting the physical machine to deploy the removed virtual machine further comprises:
- determining, according to the current utilization ratios of each physical machine, the physical machines that have residual capability satisfying the task of the removed virtual machine;
- determining load mean values of the properties in the scheduling domain according to the current utilization ratios of each physical machine, and calculating load variance values of the physical machines according to the load mean values and the load predicted values of the properties of the physical machines; and
- selecting a new physical machine with a minimum load variance value to deploy the current task of the removed virtual machine.

9. A server having a processor for implementing load balance of resources in a data center, comprising:
- a selection control module, configured to obtain, by the processor, current utilization ratios of properties of each physical machine in a scheduling domain, and determine, according to the current utilization ratios, physical machines that have residual capability satisfying a current task, wherein the properties comprises a CPU load, a memory load and a network load;
- a calculation processing module, configured to determine load mean values of properties of the scheduling domain according to the current utilization ratios, and calculate load variance values of the physical machines according to the load mean values of the properties of the scheduling domain and load predicted values of the properties of the physical machines, wherein the calculation processing module comprises:
  - a predicting unit, configured to, for the physical machines satisfying the current task for allocating the virtual machine, predict the utilization ratios of the properties of the physical machines after a virtual machine is deployed, and obtain load predicted values, and
  - a determining unit, configured to calculate and obtain the load variance value according to the load mean values and the load predicted values, wherein a calculation formula of the load variance value comprises:

$$D=(a\%-x)^2+(b\%-y)^2+(c\%-z)^2$$

wherein, a%, b% and c% are load predicted values of the CPU, memory and network obtained after the virtual machine is deployed for the physical machine, x, y and z are respectively a current CPU load mean value, a memory load mean value and a network load mean value in the scheduling domain; and
- a deployment executing module, configured to select a physical machine with a minimum load variance value to deploy the current allocation task.

10. The server according to claim 9, wherein the selection control module comprises:
- a calculation unit, configured to use a difference value of overall load capability of properties of each physical machine in the scheduling domain and the current utilization ratios of the properties of each physical machine as the residual capability of the properties of each physical machine; and
- a decision unit, configured to compare the residual capability with a specification of the current task for allocating the virtual machine to determine the physical machines that have the residual capability greater than or equal to the current task for allocating the virtual machine.

11. The server according to claim 9, further comprising:
- a task processing module, configured to determine whether the current task is a single virtual machine task;
- when the current task for allocating the virtual machine is a single virtual machine task, arrange the physical machines in the scheduling domain into an n*(m+2) matrix, wherein m=MAX (the number of CPUs of a single physical machine), each row of the matrix indicates a utilization ratio of each CPU of every physical machine in a period of time, a memory utilization ratio of every physical machine in a period of time and a network utilization ratio of every physical machine in a period of time, and each column indicates each physical machine in the scheduling domain; and when the current task for allocating the virtual machine is a non-single virtual machine task, arrange the physical machine clusters in the scheduling domain into an n*3 matrix, wherein each row of the matrix indicates a CPU utilization ratio of a physical machine cluster in a period of time, a memory utilization ratio of a physical machine cluster in a period of time and a network utilization ratio of a physical machine cluster in a period of time, and each column indicates each physical machine cluster in the scheduling domain.

12. The server according to claim 9, wherein the deployment executing module comprises:
a selection module, configured to determine whether the number of the physical machines with the minimum load variance value or the number of physical machine clusters with the minimum load variance value is more than 1; and
an executing unit, configured to, when the number of physical machines or the number of physical machine clusters is one, select a physical machine with the minimum load variance value or a physical machine cluster with the minimum load variance value in the physical machines or the physical machine clusters for deployment, wherein the physical machines or the physical machine clusters satisfy the current task; and when the number of physical machines or the number of physical machine clusters is more than one, randomly select a physical machine or physical machine cluster to deploy the task.

13. The server according to claim 9, further comprising:
an alarm monitoring module, configured to monitor the utilization ratios of the properties of each physical machine in the scheduling domain;
an alarm removing module, configured to, remove the virtual machine on the physical machines according to a difference between a predetermined alarm value of the property and a load mean value of the property in the scheduling domain when a utilization ratio of the property exceeds the predetermined alarm value and triggers an alarm for removing; and a removing deployment module, configured to search a physical machine to deploy the removed virtual machine.

14. The server according to claim 12, wherein the removing deployment module further comprises:
a calculation processing unit, configured to determine, according to the current utilization ratios of each physical machine, the physical machines that have the residual capability satisfying the task of the removed virtual machine; and determine load mean values of properties of the scheduling domain according to the current utilization ratios of each physical machine, and calculate the load variance values of the physical machines according to the load mean values of the properties of the scheduling domain and load predicted values of the properties of the physical machines; and
a deployment executing module, configured to select the physical machines with a minimum load variance value to deploy the current task of the removed virtual machine.

15. The server according to claim 9, further comprising:
an optimization selecting module, configured to determine an ID of a physical machine requiring an optimization operation;
an optimization operating module, configured to compare a difference value of a current utilization ratio of each property of the physical machine and an optimization objective value with a utilization ratio of a property of each virtual machine on the physical machine, so as to determine the removed virtual machine; and
an optimization deployment module, configured to select a new physical machine to deploy the removed virtual machine.

16. The server according to claim 14, wherein the optimization deployment module further comprises:
an optimization calculation unit, configured to determine, according to the current utilization ratios of each physical machine, the physical machines that have the residual capability satisfying the task of the removed virtual machine; and determine load mean values of properties of the scheduling domain according to the current utilization ratios of each physical machine, and calculate the load variance values of the physical machines according to the load mean values of the properties of the scheduling domain and load predicted values of the properties of the physical machines; and
an optimization deployment unit, configured to select the new physical machine with a minimum load variance value to deploy the current task of the removed virtual machine.

* * * * *